United States Patent
Wang et al.

(10) Patent No.: US 10,384,642 B2
(45) Date of Patent: Aug. 20, 2019

(54) METHODS AND SYSTEMS FOR VEHICLE THEFT DETECTION AND PREVENTION USING A SMARTPHONE AND VIDEO-BASED PARKING TECHNOLOGY

(71) Applicant: CONDUENT BUSINESS SERVICES, LLC, Dallas, TX (US)

(72) Inventors: Yao Rong Wang, Webster, NY (US); Michael Furst, Rochester, NY (US); Panya Chanawangsa, Williamsville, NY (US)

(73) Assignee: Conduent Business Services, LLC, Florham Park, NJ (US)

( * ) Notice: Subject to any disclaimer, the term of this patent is extended or adjusted under 35 U.S.C. 154(b) by 1460 days.

(21) Appl. No.: 13/944,177

(22) Filed: Jul. 17, 2013

(65) Prior Publication Data
US 2015/0022663 A1    Jan. 22, 2015

(51) Int. Cl.
*H04N 7/18* (2006.01)
*B60R 25/102* (2013.01)
*G08B 13/196* (2006.01)

(52) U.S. Cl.
CPC ...... *B60R 25/102* (2013.01); *G08B 13/19602* (2013.01); *H04N 7/183* (2013.01)

(58) Field of Classification Search
CPC ............... B60R 25/1004; G08B 13/19606
See application file for complete search history.

(56) References Cited

U.S. PATENT DOCUMENTS

| | | | |
|---|---|---|---|
| 6,002,326 A | 12/1999 | Turner | |
| 6,150,927 A | 11/2000 | Nesbitt | |
| 7,382,244 B1 * | 6/2008 | Donovan | G08B 13/19645 340/506 |
| 7,397,358 B2 | 7/2008 | Boothroyd | |
| 7,737,837 B2 | 6/2010 | Donovan et al. | |
| 7,772,967 B2 | 8/2010 | Tanaka et al. | |
| 7,801,507 B2 | 9/2010 | Benco et al. | |
| 7,893,848 B2 | 2/2011 | Chew | |
| RE42,915 E | 11/2011 | Okada | |
| 8,115,656 B2 | 2/2012 | Bevacqua et al. | |
| RE43,891 E | 1/2013 | Golden | |
| 8,392,118 B2 * | 3/2013 | Korn | G01C 21/00 340/539.13 |
| 8,451,331 B2 | 5/2013 | Hughes | |
| 2009/0040307 A1 | 2/2009 | Rubin | |

(Continued)

FOREIGN PATENT DOCUMENTS

| | | |
|---|---|---|
| EP | 0 602 765 A2 | 6/1994 |
| EP | 2 384 958 A1 | 11/2011 |

OTHER PUBLICATIONS

U.S. Appl. No. 13/441,269, filed Apr. 6, 2012, Bulan et al.

(Continued)

*Primary Examiner* — Zhubing Ren
(74) *Attorney, Agent, or Firm* — Loza & Loza LLP; Richard H. Krukar; Kermit D. Lopez (57) ABSTRACT

Methods and systems for preventing vehicle theft. A video stream of a parking area wherein a vehicle is parked can be captured, the video stream provided by a theft notification service to which the vehicle is pre-registered. The vehicle in the video stream can be identified. The video stream is then analyzed to detect motion with respect to the vehicle. An alert can then be generated if motion is detected.

16 Claims, 8 Drawing Sheets

(56) References Cited

U.S. PATENT DOCUMENTS

2009/0262189 A1* 10/2009 Marman .......... G08B 13/19613
  348/143
2009/0309709 A1* 12/2009 Bevacqua ............. B60R 25/102
  340/426.18

OTHER PUBLICATIONS

U.S. Appl. No. 13/461,266, filed May 1, 2012, Bulan et al.
U.S. Appl. No. 13/461,221, filed May 1, 2012, Bulan et al.
U.S. Appl. No. 13/441,294, filed Apr. 6, 2012, Bernal.
U.S. Appl. No. 13/461,191, filed May 1, 2012, Wang et al.
U.S. Appl. No. 13/461,161, filed May 1, 2012, Fan et al.
U.S. Appl. No. 13/441,253, filed Apr. 6, 2012, Bulan et al.
U.S. Appl. No. 13/684,817, filed Nov. 26, 2012, Wang et al.
U.S. Appl. No. 13/836,310, filed Mar. 15, 2013, Wu et al.
U.S. Appl. No. 13/835,386, filed Mar. 15, 2013, Bulan et al.
U.S. Appl. No. 13/913,606, filed Jun. 10, 2013, Wu et al.
U.S. Appl. No. 13/920,361, filed Jun. 18, 2013, Wang et al.
U.S. Appl. No. 13/922,091, filed Jun. 19, 2013, Bulan et al.
U.S. Appl. No. 13/918,364, filed Jun. 14, 2013, Wang et al.
U.S. Appl. No. 13/861,553, filed Apr. 12, 2013, Bulan et al.
U.S. Appl. No. 13/935,605, filed Jul. 5, 2013, Wang et al.

* cited by examiner

METHODS AND SYSTEMS FOR VEHICLE THEFT DETECTION AND PREVENTION USING A SMARTPHONE AND VIDEO-BASED PARKING TECHNOLOGY

FIELD OF THE INVENTION

Embodiments are generally related to the field of automatic anomaly detection. Embodiments also relate to the prevention of vehicle theft and vandalism. Embodiments are also related to video-based parking technologies. Embodiments further relate to parking management and transportation systems.

BACKGROUND

The security of a parking location is often a concern of a driver. The ability to detect vandalism or theft is thus of utmost concern when implementing parking management solutions.

Automobile theft detection and prevention is currently accomplished in a number of ways. For example, theft prevention systems can be installed in vehicles. The development of a vehicle security system for protecting a vehicle from theft while the vehicle is unattended in a parking position is typically the vehicle manufacturer's responsibility. Vehicle manufacturers' solutions typically involve adding hardware or a software component to the vehicle. As this increases the cost of the vehicle, not every vehicle is equipped with such a system.

Another solution involves simply parking in a secured location and asking someone to watch or attend to the vehicle. Access to information that shows which parking locations are safer than others, however, is not always available. Therefore, finding a secure site in which to park is not always possible and finding someone to watch a car is not necessarily cost effective based on the location, time of day, and length of time parked. This is particularly true when the parking location is on-street or curbside.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for a vehicle theft prevention and detection method and system.

It is another aspect of the disclosed embodiments to provide an improved video-based parking technology.

It is a further aspect of the disclosed embodiments to provide for a vehicle theft detection and notification system and/or service that can be offered to any vehicle in the operating range of the video parking system (whether the parking is free or not) and wherein driver(s) can subscribe (primarily via a smartphone/mobile device).

The aforementioned aspects and other objectives and advantages can now be achieved as described herein. Methods and systems for preventing vehicle theft are disclosed. A video stream of a parking area wherein a vehicle is parked can be captured, the video stream provided by a theft notification service to which the vehicle is pre-registered. The vehicle in the video stream can be identified. The video stream is then analyzed to detect motion with respect to the vehicle. An alert can then be generated if motion is detected.

Embodiments can be implemented in the context of an "app" or service that is capable of alerting someone parking on a city street that their car has been moved without their permission. This disclosed approach uses a mobile phone to allow a driver to register their vehicle for a theft notification system. A video camera mounted with a view of the parking area on a street captures video streams. A video processing system identifies objects (e.g., cars) and generates an alert when a car is moved without the user's acknowledgement, and the alert will be sent to the registered mobile device user. The driver can then notify police with the registered vehicle information if they think the car is being stolen. The police also can be sent the link for verification, enforcement, and prosecution. Enhancement to the system include mobile applications that display theft statistics and pricing.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items. The term "vehicle" as utilized hereinafter includes, but is not limited to, for example, cars, trucks, trailers, motorcycles, bicycles, etc.

The disclosed embodiments utilize video-based parking technology to implement vehicle theft detection and prevention using elements of video based parking systems and smartphone/mobile device based applications. This service can be offered to any vehicle parked within the context of such a video based parking system. Advantages of this approach include: no additional HW/SW needs to be added to the vehicle itself, monitoring and detection of a wide variety of anomalous behavior can be achieved with no additional HW in the video based parking system, and many options for preventive action can be pursued because of the availability of live video that can be machine or human monitored in contrast to a simple "beeping horn" in a car-based system.

Figure 1:
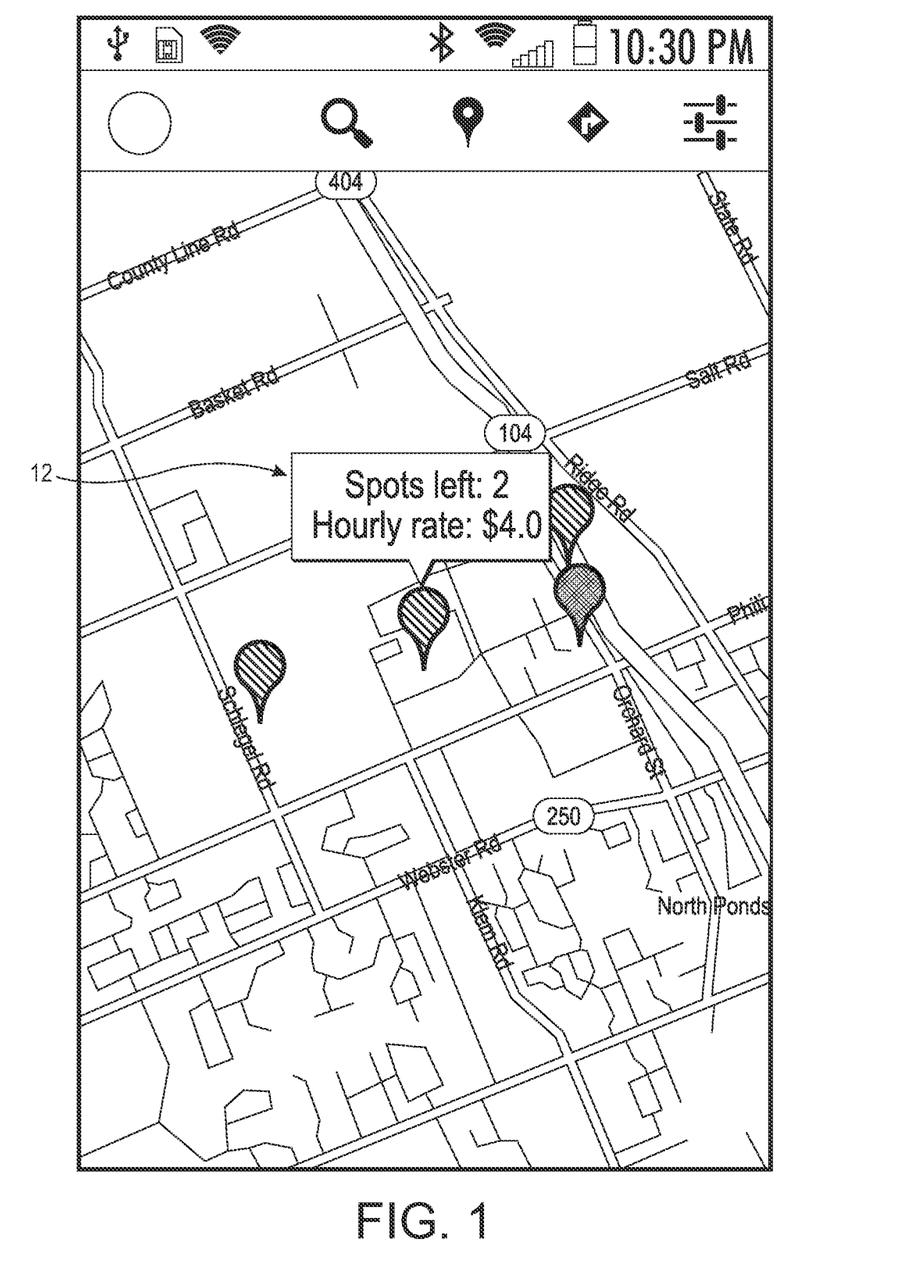
FIG. 1 illustrates a screenshot of an example parking "app" that can be implemented via a Smartphone or other computing device, in accordance with a preferred embodiment.

FIG. 1 illustrates a screenshot of an example parking "app" that can be implemented via a Smartphone or other computing device 10, in accordance with a preferred embodiment. The parking "app" can be part of an offering of a theft notification service. The "app" itself functions to find an available parking spot, to find an available parking spot with available theft notification service, and to notify a user of a potential theft related to his or her vehicle, as will be explained in greater detail herein. As shown in FIG. 1, a Smartphone 10 displays a GUI (Graphical User Interface) that can include, for example, graphically displayed maps and directions and in some situations, turn-by-turn directions to a particular destination 12 along with, for example, 2D satellite and 3D earth views; along with in some instances, photographic views of the turns, which show the real streets and surroundings. The data displayed via such a GUI can be derived from, for example, satellite mapping information and other geographical data. Note that as utilized herein the term "app" is an an abbreviation for "application". An app is thus a piece of software. It can run on the Internet, on a computer, or on a mobile computing device or other electronic device.

Figure 2:
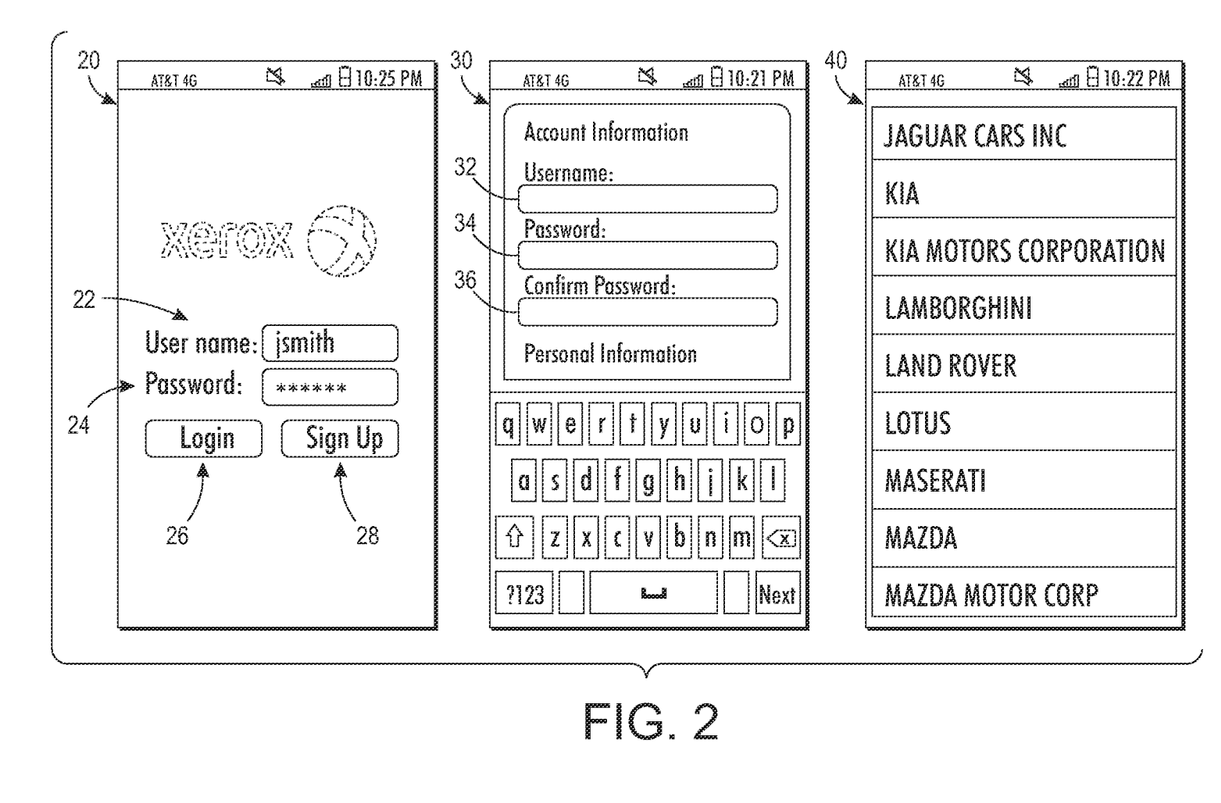
FIG. 2 illustrates screenshots of three respective GUI displays, which are also displayable via a Smartphone such as shown in FIG. 1, in accordance with a preferred embodiment.

FIG. 2 illustrates screenshots of three respective GUI displays 20, 30, and 40, which are also displayable via a Smartphone such as shown in FIG. 1, in accordance with a preferred embodiment. FIG. 2 thus demonstrates how a user can register his/her vehicle by inputting his/her vehicle's information. Thus, for example, GUI 20 includes an input field 22 for entering a username and an input field 24 for entering a password to access the parking app. Graphically displayed login button 26 and sign-up button 28 are also displayable via the GUI 20. To the right of GUI 20 is shown a subsequent GUI 30 that allows a user to enter additional account information into 32, 34, 36 after logging into the app via, for example, the login button 26. GUI 40 allows for the selection and/or identification of a number of different types of vehicle types (e.g., KIA, JAGUAR, etc.). Additional vehicle information (e.g., vehicle's color and model) can also be included in the registration process.

Figure 3:
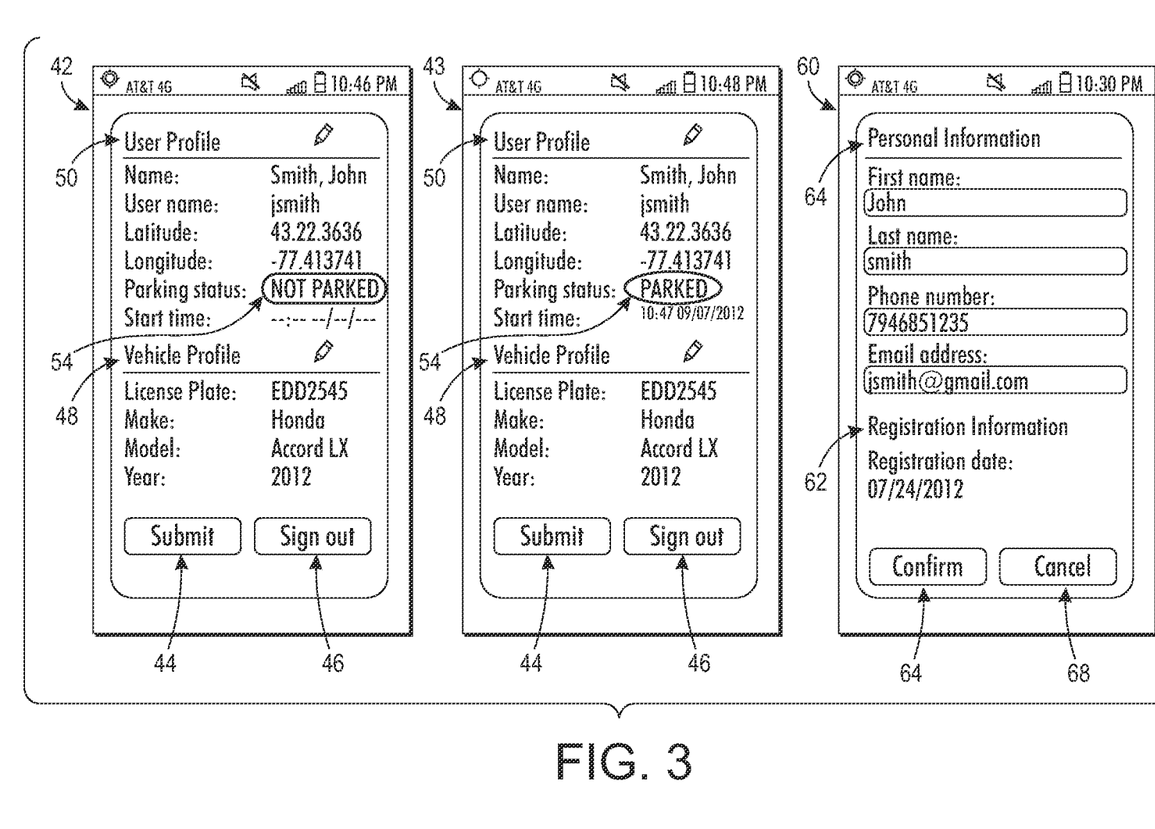
FIG. 3 illustrates additional GUI's displaying different user options, in accordance with a preferred embodiment.

FIG. 3 illustrates additional GUI's 42, 43, and 60 displaying different user options, in accordance with a preferred embodiment. GUI 42, for example, offers a section 50 that displays user profile information including, for example, a parking status field 54 that displays parking information such as, for example "NOT PARKED." A section 48 can display vehicle profile information, which may be entered and altered by the user. Submission of this information can occur via, for example, a submit button 44. The user can sign out via sign out button 46. GUI 43 displays information and options similar to that shown in GUI 42. In the example of GUI 43, the status identifier 54 indicates "PARKED" as opposed to "NOT PARKED" shown in GUI 42. GUI 60 permits a user to enter and/or view personal information 64 and registration information 62. Buttons 64 and 68 respectively allow a user to submit or cancel the entry or viewing of such information.

A variety of steps can be implemented for the vehicle stealing prevention technique discussed herein. Although the methodology disclosed herein generally relates to applications implemented via a Smartphone, it can be appreciated that they are also capable of being implemented via other computing devices such as desktop personal computers, laptop computers, "pad" computing devices (e.g., Android, Apple, etc.) as well as vehicle on-board wireless communication devices.

Thus, a user can sign up or login to the mobile parking application through a smartphone or other platform prior to parking as shown in FIG. 2 (e.g., see the login button 26 and the sign up button 28). Information can be provided to the user to guide the user to parking locations where parking is available and video security is an option. FIG. 1, for example, shows the mobile parking space finding application that can guide users to the appropriate parking spot. The safety and cost status for theft/vandalism can also be presented to reinforce the value of the option to the user. Information will be provided stating whether security is an option the client pays for or included automatically as part of the parking service and fees.

At the sign up step, the user's information such as vehicle type, vehicle color, license plate number, or the parking account number (if the user already has an account), etc., can be entered or retrieved from memory and populated in the application automatically. Many services paid or free are provided after login. Security monitoring is one such service.

Either before or after parking, the user is prompted to answer if he/she would like to have the vehicle theft and vandalism monitoring and prevention service added to their parking spot. If the user clicks "yes", a unique ID code (such as the vehicle's license plate number or the parking account number) is created by the mobile parking application and sent to the server to register the vehicle and the services desired.

The service can be initiated when the car is parked in an appropriate location. The server with vehicle detection video analytics associates the code with the parking vehicle. Typically, the vehicle's GPS location and starting parking time are enough to distinguish the vehicle from its neighboring parked vehicles. Occasionally, when two vehicles come to park at about the same time and parked near each other, other information such as the vehicle's color and size will be used for this association. If the vehicle's license plate number is provided in the sign up step, and the video analytics is capable of detecting and recognizing license plate number (Ref. [5]), this association will be even easier.

After parking, the user is asked to confirm the "start of security" monitoring of the vehicle and, optionally, some confirming picture or info is presented to the user to confirm their vehicle is the proper one. During the length of the parking session the video feeds, which include the vehicle with the security option selected, are recorded for review if needed, and segmented and processed by video analytics including the theft detection software.

There are several ways to detect theft. For example, if the prevention code is still active while the vehicle is leaving the parking spot, the vehicle detection video analytics will detect the vehicle's movement and an alarm will be sent to the user's smartphone. The alert may include a question to ask the user whether the movement of his/her vehicle is authorized. If the user replies "yes", no further action will be taken. If the user replies "no", a theft event is detected.

Several actions can be configured to occur if a theft event is detected. For example, police contact information can be attached to the alarm so that the user can directly contact the police. Recorded videos are also available for police to review. In case of a false alarm, the user can "click" away the alarm to let the server know. The system can attempt several different mechanisms to contact the owner of the vehicle or item under secure observation in order to be robust vs. forgetting to turn off the security feature. After repeated alarms sent to the user without response, the server can initiate a call to police providing the location and vehicle information (maker, model, color, license plate number etc.) and a copy of the relevant video if desired by local police enforcement When ending the parking session and the theft prevention service, the user can click a button from his/her smartphone to let the server know the end of the parking session. The server will de-activate the created theft and vandalism prevention code and turn off the service. To prevent the user accidentally hit the button, the de-activation may only be done when the smartphone is near the vehicle's location or an "are you sure" check before turning off the service is required.

This service can be provided either based on the parking time monitored (as the video parking technology is capable of determining parking time) or each parking session. It could have tiers of services based on machine monitoring, human monitoring, and the aggressiveness of the actions taken in response to a detected event.

While the focus of the disclosed embodiments are generally for a automobile's theft prevention, it is foreseeable to extend it to the same prevention for motorcycles, bicycles, etc., as the same steps above can be applied. Thus, the term "vehicle" as utilized herein can refer to a variety of vehicles such as automobiles, trucks, bicycles, motorcycles, etc.

The disclosed embodiments can be implemented in, for example, a smartphone parking application with real time parking availability data inputting from cameras. Parking space finding and reservation as well as automatic parking bill payment are some of the functions that can be incorporated into the "app". Security applications can be added on top of these functions.

FIG. 3 illustrates how a registered user can park his/her vehicle and then get billed later with exact parking time. When the user parks his/her car, he/she is required to initiate a parking session by logging into the application and pressing the submit button. In doing so, his/her account information, time stamp as well as the GPS coordinates are transmitted to the central server. If the user signed up for the vehicle stealing prevention service, the code created as described above can be sent together with all the other information shown.

Figure 4:
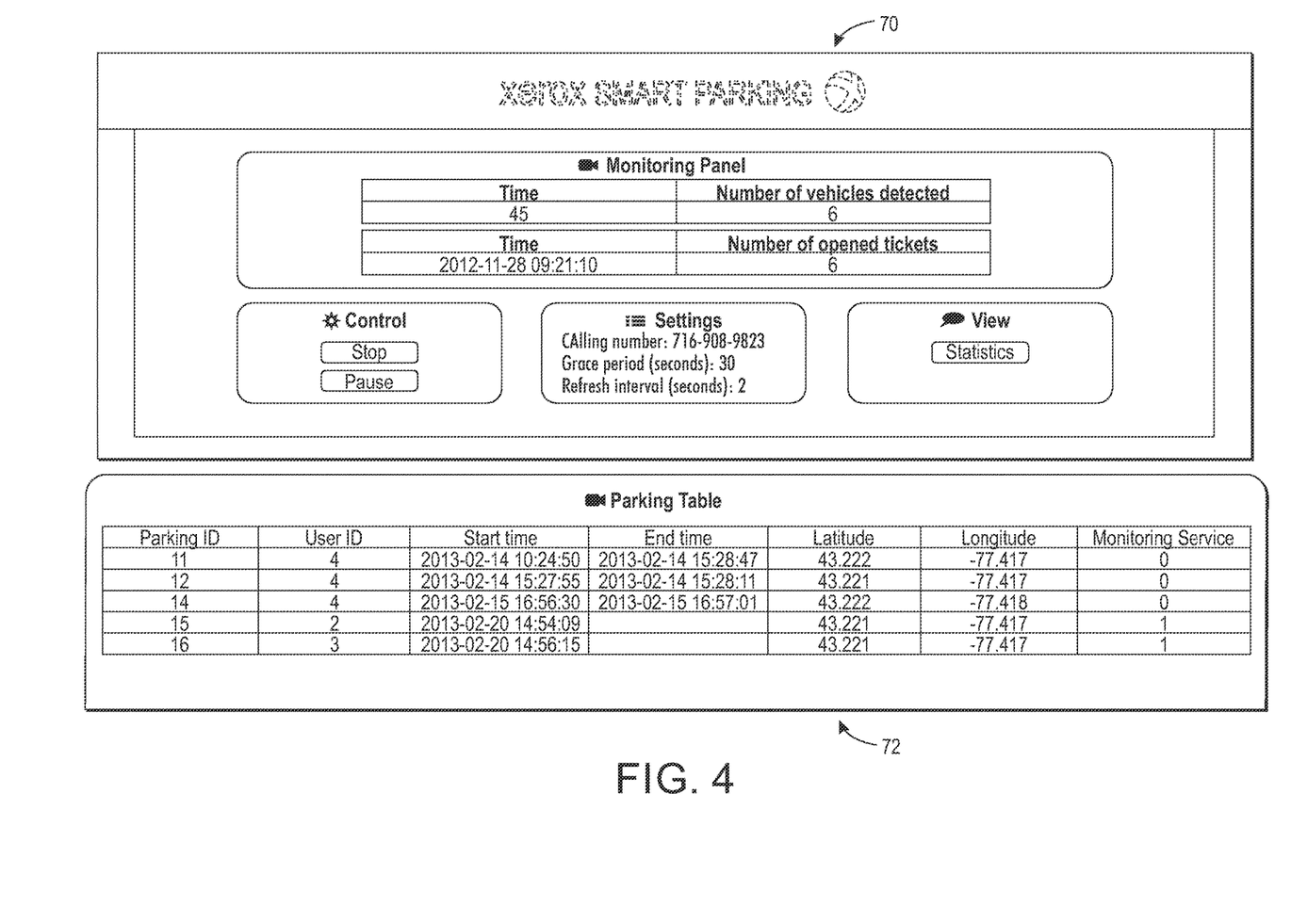
FIG. 4 illustrates example GUIs, which can be implemented with respect to the server side that takes the vehicle occupancy data from video detection data and compares it with the current occupancy data including the vehicles signed up with the theft and vandalism prevention service, in accordance with embodiment.

FIG. 4 illustrates example GUIs 70 and 72 which can be implemented with respect to the server side that takes the vehicle occupancy data from video detection data and compares it with the current occupancy data including the vehicles signed up with the theft prevention service, in accordance with embodiment. GUI's 70 and 72 illustrates a prototype of a web-based monitoring tool. The value "0" shown in the parking table of GUI 72 indicates that the vehicle does not have the theft prevention service and "1" means the prevention service is enabled (e.g., see the column labeled "Monitoring Service" in the parking table displayed via GUI 72).

Figure 5:
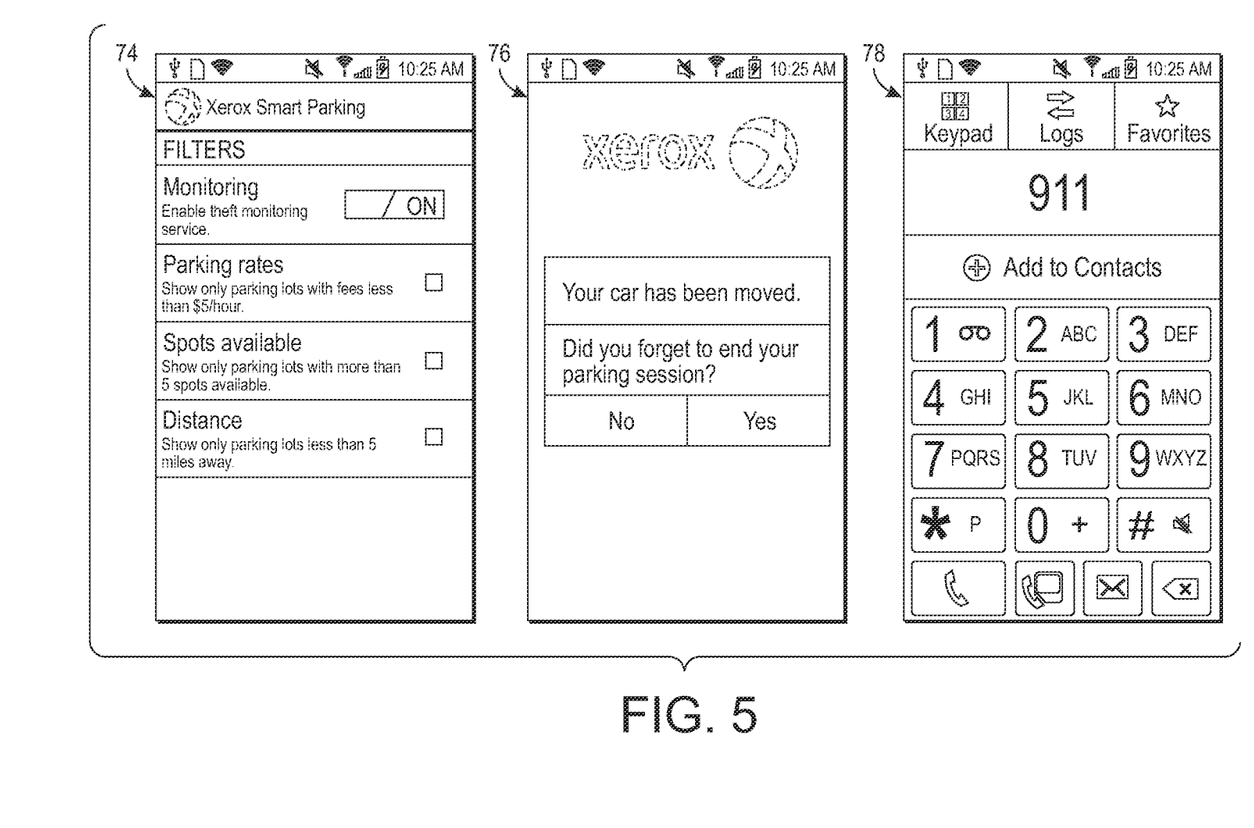
FIG. 5 illustrates example "app" GUI's, which can be implemented in accordance with an alternative embodiment.

FIG. 5 illustrates Smartphone app GUI's 74, 76, and 78, which can be implemented in accordance with an alternative embodiment. GUI 74 provides a filter for theft prevention monitoring service. When the filter in "on", the user enabled the theft prevention and notification service. The user could select "off" even if he/she already registered with the theft prevention/notification service. GUI 76 indicates that when the car is detected to have left the parking spot without the user deactivating the prevention service, a notification can be sent to the user (e.g., "Your car has been moved" and "Did you forget to end your parking session?"). If the user selects "No", a dial pad can be presented to the user as shown via GUI 78 so that the user can conveniently call the police or an appropriate emergency service.

Figure 6:
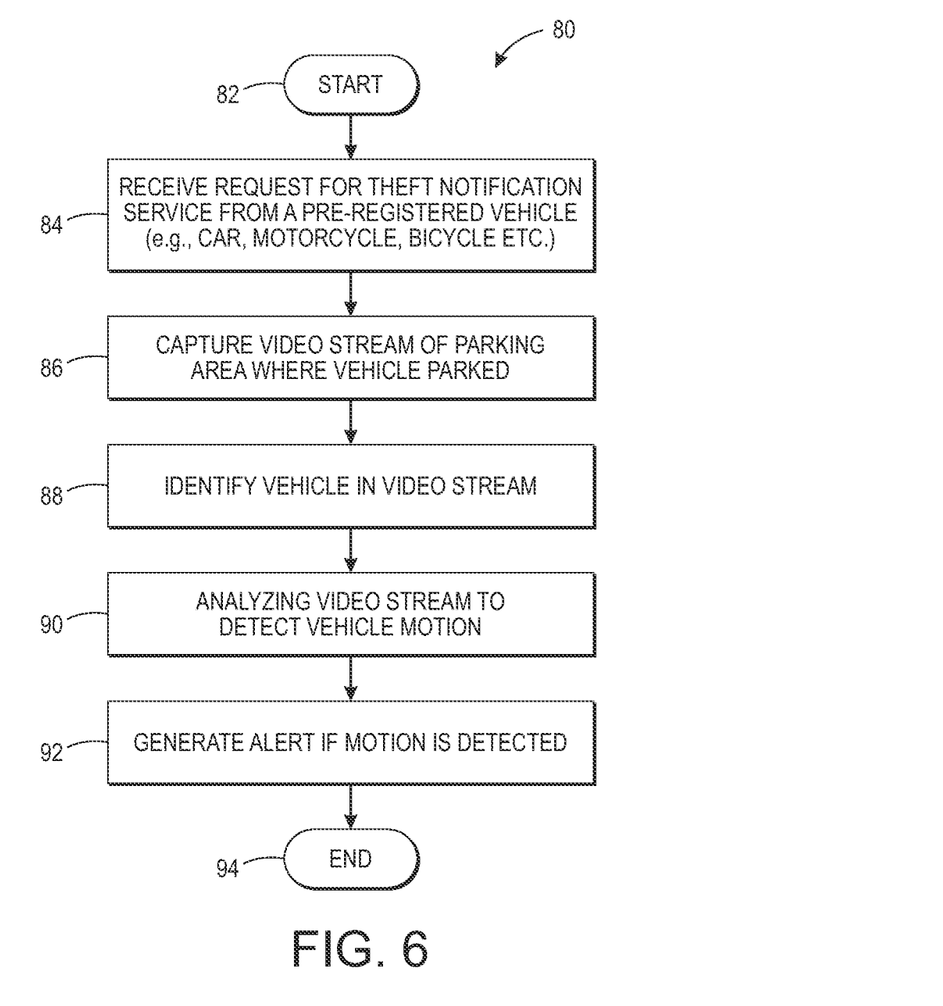
FIG. 6 illustrates a high-level flow chart of operations depicting logical operational steps of a method for preventing theft, in accordance with a preferred embodiment.

FIG. 6 illustrates a high-level flow chart of operations depicting logical operational steps of a method 80 for preventing theft, in accordance with a preferred embodiment. As indicated at block 82, the process can be initiated. Thereafter, as shown at block 84, a server (e.g., a theft prevention/notification server) can receive a request for the theft prevention/notification service from a pre-registered vehicle user. The request can be generated from, e.g., the smartphone app by enabling the theft prevention/notification filter in GUI 74 to "on". Next, as shown at block 86, a step or logical operation can be implemented for capturing a video stream of a parking area wherein a vehicle is parked, the video stream is provided by the cameras that are deployed on the street for the video-based parking technology. Then, as depicted at block 88, a step or logical operation can be implemented for identifying the vehicle in the video stream. Next, as described at block 90, a step or logical operation can be implemented for analyzing the video stream to detect a motion with respect to the identified vehicle. Thereafter, as shown at block 92, a step or logical operation can be implemented for generating an alert if the motion is detected. The process can then terminate, as shown at block 94.

Figure 7:
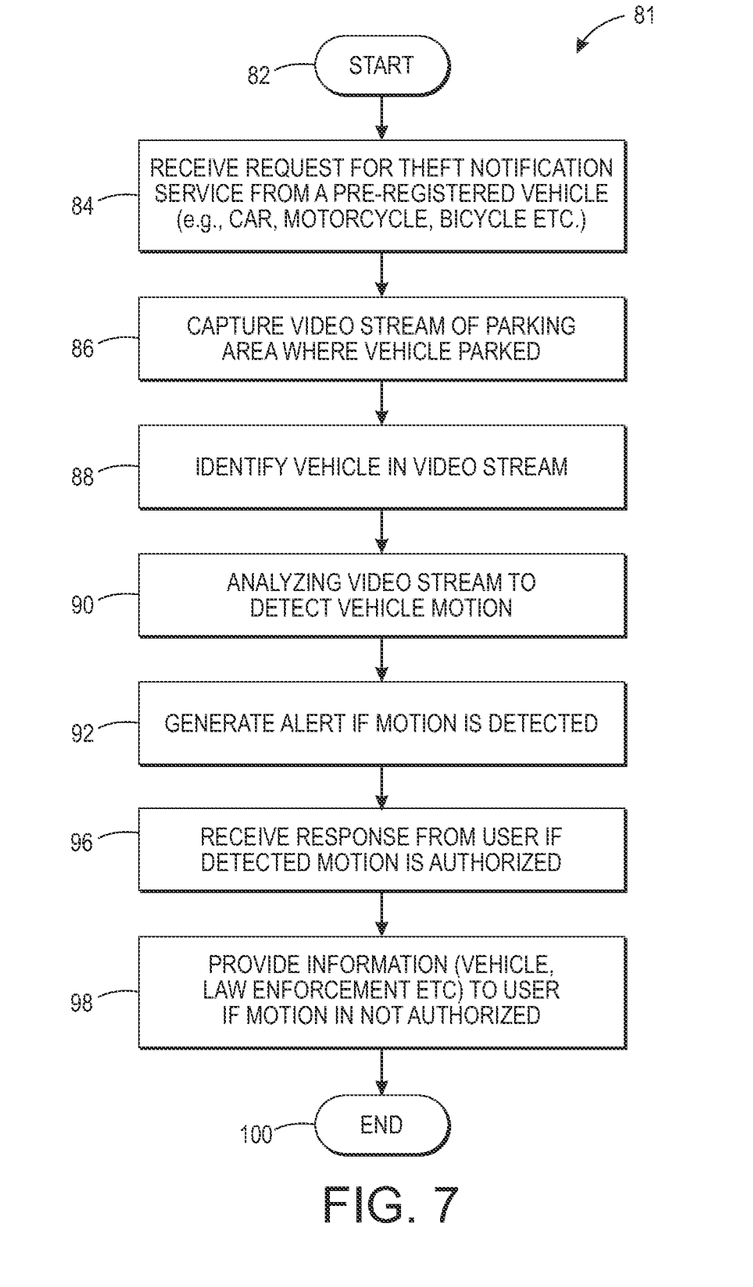
FIG. 7 illustrates a high-level flow chart of operations depicting logical operational steps of a method for preventing theft, in accordance with an alternative embodiment.

FIG. 7 illustrates a high-level flow chart of operations depicting logical operational steps of a method 81 for preventing theft/vandalism, in accordance with an alternative embodiment. Note that the method 81 is similar to the method 80 shown in FIG. 6. Thus, the same method steps/logical operations 82 to 92 are shown in both FIGS. 6-7. In the interest of brevity, a description of such steps/logical operations will not be repeated. In FIG. 7, at block 96, a step or logical operation is depicted for allowing a server (e.g., a theft prevention/notification server) to receive the user response to the alert indicating whether the user authorizes the detected motion. If the user's response is not authorized, the next step or logical operation, as depicted by block 98, is to provide contact information of law enforcement agents together with other vehicle information that helps stopping the theft. The process then terminates, as shown at block 100.

The embodiments are described at least in part herein with reference to flowchart illustrations and/or block diagrams of methods, systems, and computer program products and data structures according to embodiments of the invention. For example, FIGS. 1, 2, 3, and 5 demonstrate screenshots from a Smartphone or mobile computing device "app." FIG. 4 demonstrates one example of a management tool offered by a theft prevention/notification server. FIGS. 6-7 illustrates operational/logical steps and/or instructions of methods 80, 81. It will be understood that each block of the illustrations, and combinations of blocks, can be implemented by computer program instructions. These computer program instructions may be provided to a processor of a general-purpose computer, special purpose computer, or other programmable data-processing apparatus to produce a machine such that the instructions, which execute via the processor of the computer or other programmable data-processing apparatus, create means for implementing the functions/acts specified in the block or blocks discussed herein such as, for example, the various instructions discussed and shown with respect to the figures herein.

These computer program instructions may also be stored in a computer-readable memory that can direct a computer or other programmable data-processing apparatus to function in a particular manner such that the instructions stored in the computer-readable memory produce an article of manufacture including instruction means which implement the function/act specified in the block or blocks.

The computer program instructions may also be loaded onto a computer or other programmable data-processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 8:
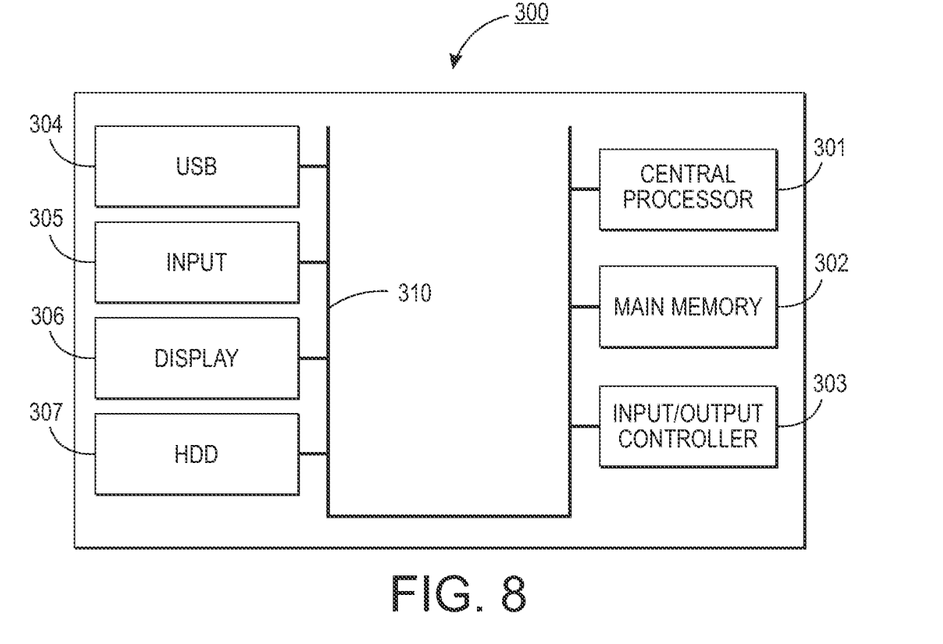
FIG. 8 illustrates a schematic view of a computer system, which can be implemented in accordance with one or more of the disclosed embodiments.
Figure 9:
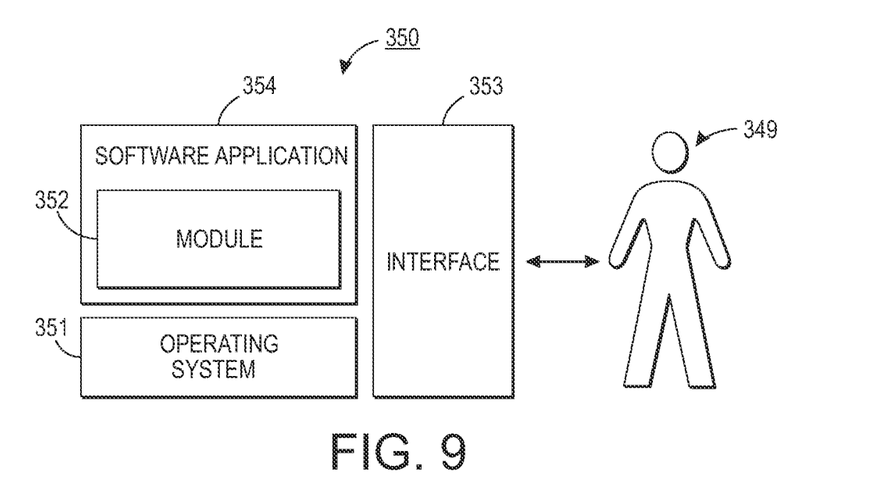
FIG. 9 illustrates a schematic view of a software system including an anomaly detection module, an operating system, and a user interface, in accordance with one or more embodiments.

FIGS. 8-9 are provided as exemplary diagrams of data-processing environments in which embodiments of the present invention may be implemented. It should be appreciated that FIGS. 8-9 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments. Note that FIGS. 8-9 generally illustrate a data-processing system in which embodiments may be implemented (e.g., such as an "app"). FIGS. 8-9 are thus representative of a variety of different types of data-processing systems and devices including, for example, servers, laptop computers, Smartphones, "pad" or tablet computing devices, desktop computers, and other computing devices.

As illustrated in FIG. 8, the disclosed embodiments may be implemented in the context of a data-processing system 300 that can include, for example, a central processor 301 (or other processors), a main memory 302, a controller 303, and in some embodiments, a USB (Universal Serial Bus) 304 or other appropriate peripheral connection. System 300 can also include an input device 305 (e.g., a keyboard, pointing device such as a mouse, etc.), a display 306, and a HDD (Hard Disk Drive) 307 (e.g., mass storage). As illustrated, the various components of data-processing system 300 can communicate electronically through a system bus 310 or similar architecture. The system bus 310 may be, for example, a subsystem that transfers data between, for example, computer components within data-processing system 300 or to and from other data-processing devices, components, computers, etc.

FIG. 9 illustrates a computer software system 350, which may be employed for directing the operation of the data-processing system 300 depicted in FIG. 8. Software application 354 can be stored in memory 302 and/or on HDD 307, and generally can include a module 352 and can be associated with a kernel or operating system 351 and a shell or interface 353. One or more application programs, such as module(s) 352, may be "loaded" (i.e., transferred from mass storage or HDD 307 into the main memory 302) for execution by the data-processing system 300. In the example shown in FIG. 9, module 352 can be implemented as, for example, a software module that can perform the logical instructions or operations of FIGS. 6-7 and so forth.

The data-processing system 300 can receive user commands and data through user interface 353 accessible by a user 349. These inputs may then be acted upon by the data-processing system 300 in accordance with instructions from operating system 351 and/or software application 354 and any software module(s) 352 thereof.

The discussion herein is thus intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules (e.g., module 352) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 353 (e.g., a graphical user interface) can serve to display results, whereupon a user may supply additional inputs or terminate a particular session. In some embodiments, operating system 351 and interface 353 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 351 and interface 353.

FIGS. 8-9 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms including Macintosh, Unix, Linux, and the like.

Based on the foregoing, it can be appreciated that a number of embodiments, preferred and alternative, are disclosed herein. For example, in one embodiment, a method for preventing vehicle theft can be implemented. Such a method can include the steps or logical operations of capturing a video stream of a parking area wherein a vehicle is parked, the video stream provided by a theft notification service to which the vehicle is pre-registered; identifying the vehicle in the video stream, analyzing the video stream to detect a motion with respect to the vehicle, and generating an alert if the motion is detected. Such a vehicle can be, for example, an automobile, motorcycle, a motorized scooter, bicycle, etc.

In another embodiment, a step or logical operation can be provided for registering the vehicle with the theft notification service via a computing device. In yet another embodiment, a step or logical operation can be provided for identifying the vehicle in the video stream using information provided by the registering of the vehicle with the theft notification service. In still another embodiment, a step or logical operation can be provided for transmitting the alert regarding the motion to a mobile communications device of a user associated with the vehicle.

In another embodiment, a step or logical operation can be provided for transmitting back a response from the user regarding the alert to indicate whether the user authorized the motion. In yet another embodiment, a step or logical operation can be provided for providing a link to a webpage associated with the theft notification service, wherein the webpage displays interactive data for verification, enforcement, and prosecution use by civil authorities. In some embodiments, the aforementioned motion can constitute an unauthorized movement of the vehicle.

In another embodiment, a system for preventing vehicle theft can be implemented. Such a system can include, for example, a processor, a data bus coupled to the processor, and a computer-usable medium embodying computer program code, the computer-usable medium being coupled to the data bus. Such computer program code can include instructions executable by the processor and configured, for example, for capturing a video stream of a parking area wherein a vehicle is parked, the video stream provided by a theft notification service to which the vehicle is pre-registered, identifying the vehicle in the video stream, analyzing the video stream to detect a motion with respect to the vehicle, and generating an alert if the motion is detected.

In another embodiment, such instructions can be further configured for registering the vehicle with the theft notification service via a computing device. In yet another embodiment, such instructions can be further configured for identifying the vehicle in the video stream using information provided by the registering of the vehicle with the theft notification service. In still another embodiment, such instructions can be further configured for transmitting the alert regarding the motion to a mobile communications device of a user associated with the vehicle. In another embodiment, such instructions can be further configured for transmitting back a response from the user regarding the alert to indicate whether the user authorized the motion. In another embodiment, such instructions can be further configured for providing a link to a webpage associated with the theft notification service, wherein the webpage displays interactive data for verification, enforcement, and prosecution use by civil authorities.

In another embodiment, a processor-readable medium storing computer code representing instructions to cause a process for preventing vehicle theft, can be implemented. Such computer code can include code, for example: capture a video stream of a parking area wherein a vehicle is parked, the video stream provided by a theft notification service to which the vehicle is pre-registered, identify the vehicle in the video stream, analyze the video stream to detect a motion with respect to the vehicle, and generate an alert if the motion is detected.

In some embodiments, such code can further comprise code to register the vehicle with the theft notification service via a computing device, and identify the vehicle in the video stream using information provided by the registering of the vehicle with the theft notification service. In another embodiment, such code can further include code to transmit the alert regarding the motion to a mobile communications device of a user associated with the vehicle, and transmit back a response from the user regarding the alert to indicate whether the user authorized the motion.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for preventing vehicle theft, the method comprising:
   receiving user registration information from a user wherein the registration information comprises a user identifier and a password;
   receiving vehicle identification information from the user wherein the vehicle identification information identifies a vehicle;
   storing the vehicle identification information in association with the user registration information;
   accepting a request from the user that the vehicle be monitored, wherein the vehicle is parked in a parking area, wherein at least one camera monitors the parking area, wherein the at least one camera produces at least at least one video stream, and wherein the vehicle is visible in at least one of the at least one video stream;
   receiving the at least one video stream;
   identifying the vehicle in the at least one video stream;
   analyzing the at least one video stream to detect a movement of the vehicle; and
   sending the user an alert because of the movement of the vehicle wherein the alert informs the user that the vehicle moved.

2. The method of claim 1 wherein the vehicle is a bicycle.

3. The method of claim 1 further comprising receiving the vehicle identification information from a computing device wherein the user provides the vehicle identification information via the computing device.

4. The method of claim 3 further comprising identifying the vehicle in the at least one video stream by using the vehicle identification information.

5. The method of claim 1 further comprising sending the alert to a mobile communications device wherein the user receives the alert from the mobile communications device.

6. The method of claim 5 further comprising accepting a response from the mobile communications device wherein the response indicates that the user authorized the movement.

7. The method of claim 1 further comprising providing a link to a webpage wherein the webpage displays interactive data for verification, enforcement, and prosecution use by civil authorities.

8. The method of claim 1 further comprising:
accepting a response from the mobile communications device wherein the response indicates that the user did not authorized the movement; and
providing the user with theft information wherein the user provides the theft information to law enforcement authorities to thereby report a theft.

9. A system for preventing vehicle theft, the system comprising:
a processor;
a data bus coupled to the processor; and
a computer-usable medium embodying computer program code, the computer-usable medium being coupled to the data bus, the computer program code comprising instructions executable by the processor and configured for:
receiving user registration information from a user wherein the registration information comprises a user identifier and a password;
receiving vehicle identification information from the user wherein the vehicle identification information identifies a vehicle;
storing the vehicle identification information in association with the user registration information;
accepting a request from the user that the vehicle be monitored, wherein the vehicle is parked in a parking area, wherein at least one camera monitors the parking area, wherein the at least one camera produces at least at least one video stream, and wherein the vehicle is visible in at least one of the at least one video stream;
receiving the at least one video stream;
identifying the vehicle in the at least one video stream;
analyzing the at least one video stream to detect a movement of the vehicle; and
sending the user an alert because of the movement of the vehicle wherein the alert informs the user that the vehicle moved.

10. The system of claim 9 wherein the vehicle is a bicycle.

11. The system of claim 9, the instructions further configured for receiving the vehicle identification information from a computing device.

12. The system of claim 11 wherein the vehicle is identified using the vehicle identification information.

13. The system of claim 9 wherein the instructions are further configured for:
accepting device information wherein the device information specifies a mobile communications device; and
sending the alert to the mobile communications device.

14. The system of claim 13 wherein the instructions are further configured for accepting a response from the mobile communications device wherein the response indicates that the movement is authorized.

15. The system of claim 9 wherein the instructions are further configured for providing a link to a webpage wherein the webpage provides evidence of a theft.

16. The system of claim 9 wherein the instructions are further configured for:
accepting a response from a mobile communications device wherein the response indicates that the movement is not authorized; and
providing the user with theft information evidencing a theft.

* * * * *